US012393257B2

(12) United States Patent
Houk et al.

(10) Patent No.: US 12,393,257 B2
(45) Date of Patent: Aug. 19, 2025

(54) WAKEUP CIRCUIT

(71) Applicant: Apple Inc., Cupertino, CA (US)

(72) Inventors: Talbott M. Houk, Monte Sereno, CA (US); Wenxun Huang, Palo Alto, CA (US); Nikola Jovanovic, Munich (DE); Floyd L. Dankert, Austin, TX (US); Sanjay Pant, Santa Clara, CA (US); Alessandro Molari, Eichenau (DE); Siarhei Meliukh, Munich (DE); Nicola Florio, Munich (DE); Ludmil N. Nikolov, Chippenham (GB); Nathan F. Hanagami, San Francisco, CA (US); Hartmut Sturm, Germering (DE); Di Zhao, Santa Clara, CA (US); Chad L. Olson, Santa Clara, CA (US); John J. Sullivan, Sunyvale, CA (US); Seyedeh Maryam Mortazavi Zanjani, Austin, TX (US); Tristan R. Hudson, Denver, CO (US); Jay B. Fletcher, Saratoga, CA (US); Jonathan A. Dutra, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/122,410

(22) Filed: Mar. 16, 2023

(65) Prior Publication Data

US 2024/0077932 A1     Mar. 7, 2024

Related U.S. Application Data

(60) Provisional application No. 63/404,047, filed on Sep. 6, 2022.

(51) Int. Cl.
*G06F 1/00* (2006.01)
*G06F 1/3212* (2019.01)
(Continued)

(52) U.S. Cl.
CPC .......... *G06F 1/3296* (2013.01); *G06F 1/3212* (2013.01); *G06F 1/3278* (2013.01); *G06F 1/3203* (2013.01)

(58) Field of Classification Search
CPC .... G06F 1/3296; G06F 1/3212; G06F 1/3278; G06F 1/263; G06F 1/266
(Continued)

(56) References Cited

U.S. PATENT DOCUMENTS

| 5,844,433 A | * | 12/1998 | Nishimura | ........... | G11C 27/024 |
| | | | | | 327/92 |
| 8,604,847 B2 | * | 12/2013 | Paul | ......................... | G06F 1/24 |
| | | | | | 327/143 |

(Continued)

FOREIGN PATENT DOCUMENTS

CN          109450052 A         3/2019

OTHER PUBLICATIONS

Jang, Taekwang et al. "5.8 A 4.7nW 13.8ppm/°C self-biased wakeup timer using a switched-resistor scheme." *2016 IEEE International Solid-State Circuits Conference(ISSCC)* (2016): 102-103.

(Continued)

*Primary Examiner* — Volvick Derose
(74) *Attorney, Agent, or Firm* — Sterne, Kessler, Goldstein & Fox P.L.L.C.

(57) ABSTRACT

The present disclosure describes a system with a power management device, a wakeup circuit, a battery management device, and a connector. During a powered down mode of operation, the battery management device can provide, via the connector, a bias voltage to the wakeup circuit. In response to a wakeup switch being activated, the battery management device can provide a power supply (e.g., from a battery) to the power management device. Benefits of the wakeup circuit include (1) a reduction of battery consumption—and thus improving battery lifetime—when the electronic system is in a powered down mode of operation because the wakeup circuit has lower number of active components compared to other designs and (2) a non-complex wakeup circuit design because one or more existing connector interconnects between the power management device and the battery management device can be re-used during electronic system's powered down mode of operation.

20 Claims, 9 Drawing Sheets

(51) Int. Cl.
 *G06F 1/3234* (2019.01)
 *G06F 1/3296* (2019.01)
 *G06F 1/3203* (2019.01)

(58) Field of Classification Search
 USPC .......................................................... 713/323
 See application file for complete search history.

(56) References Cited

U.S. PATENT DOCUMENTS

| | | | | |
|---|---|---|---|---|
| 8,744,105 | B2* | 6/2014 | Hoevesteen | H04R 25/505 |
| | | | | 381/314 |
| 11,258,276 | B2* | 2/2022 | Kim | G01R 31/396 |
| 2005/0024027 | A1* | 2/2005 | McVicar | H05B 41/40 |
| | | | | 323/255 |
| 2011/0163723 | A1* | 7/2011 | Tan | H02J 9/005 |
| | | | | 429/7 |
| 2014/0223212 | A1* | 8/2014 | Wu | G06F 1/28 |
| | | | | 713/323 |
| 2014/0253212 | A1* | 9/2014 | Steedman | G06F 1/3243 |
| | | | | 327/333 |
| 2015/0006922 | A1 | 1/2015 | Huang et al. | |
| 2016/0064776 | A1 | 3/2016 | Ro | |
| 2016/0308346 | A1* | 10/2016 | Wang | H02H 3/202 |
| 2017/0194963 | A1* | 7/2017 | Williams | G06F 13/28 |
| 2020/0052346 | A1 | 2/2020 | Park | |
| 2020/0145599 | A1* | 5/2020 | Matsuzaki | H01L 27/146 |
| 2021/0311540 | A1* | 10/2021 | Wong | G06F 1/28 |
| 2022/0077706 | A1 | 3/2022 | Sim et al. | |
| 2023/0152829 | A1* | 5/2023 | Wang | G05F 1/565 |
| | | | | 327/538 |
| 2024/0077932 | A1* | 3/2024 | Houk | G06F 1/266 |

OTHER PUBLICATIONS

International Search Report and Written Opinion directed to related International Application No. PCT/US2023/073468, mailed Jan. 8, 2024, 7 pages.

* cited by examiner

WAKEUP CIRCUIT

REFERENCE TO RELATED APPLICATION

This application claims the benefit of U.S. Provisional Patent Application No. 63/404,047, titled "Wakeup Circuit," filed on Sep. 6, 2022, the disclosure of which is incorporated by reference herein in its entirety.

FIELD

This disclosure relates to a wakeup circuit and, more particularly, to a wakeup circuit that triggers a power supply to be provided to an electronic system in response to activating a switch.

BACKGROUND

As electronic systems become more complex, battery consumption increases accordingly. For example, when an electronic system is powered down (e.g., in an off state), one or more circuits can be active and consume power to re-activate the electronic system from the off state. Additionally, other circuits may consume power when the electronic system is powered down, such as radio frequency (RF) subsystems and near field communication (NFC) circuits. As a result, these components (among others) can drain the battery at a quicker rate than less-complex electronic systems.

SUMMARY

Embodiments of the present disclosure include a system with a device and a switch. The device includes a first input/output (I/O) pin, a second I/O pin, another switch, and a buffer circuit. The other switch is configured to receive a voltage from an external device via a connector and to pass the voltage to the first I/O pin. The buffer circuit includes an input electrically connected to the second I/O pin and an output electrically connected to the external device via the connector. The switch is electrically connected to the second I/O pin, where, in response to the second switch being activated, the output of the buffer circuit transitions from a first voltage value to a second voltage value. The second voltage value is transferred to the external device via the connector. In turn, a power supply is provided to the system and the system is in a powered up mode of operation.

Embodiments of the present disclosure include another system having a battery management device, a connector, a power management device, and a wakeup switch. The battery management device is configured to output a bias voltage. The connector is configured to receive the bias voltage and to output the bias voltage. The power management device is configured to receive the bias voltage from the connector (e.g., over a data signal line between the battery management device and the power management device—in which the data signal line is used by the system during a powered up mode of operation to transfer data between the two devices), where the power management device includes a voltage bias I/O pin, a wakeup I/O pin, a first switch, and a buffer circuit. The first switch is configured to receive the bias voltage and to pass the bias voltage to the voltage bias I/O pin. The buffer circuit has an input and an output, where the input is electrically connected to the wakeup I/O pin and the output is electrically connected to the battery management device. The wakeup switch is electrically connected to the wakeup I/O pin of the power management device. In response to the wakeup switch being activated, the output of the buffer circuit transitions from a first voltage value (e.g., a logic low value) to a second voltage value (e.g., a logic high value), where the second voltage value is transferred to the battery management device via the connector. Based on detecting the change in voltage level of the output of buffer circuit (e.g., transition from a logic low value to a logic high value), the battery management device provides a power supply (e.g., battery) to the power management device, thus providing the power supply to the system.

Embodiments of the present disclosure include a method for waking up an electronic system. The method includes generating, at a battery management system of the electronic system, a bias voltage; and transferring, via a connector of the electronic system, the bias voltage from the battery management system to a power management system of the electronic system, where the connector includes at least one interconnect configured to transfer at least one signal (e.g., a data signal line) between the battery management system and the power management system, and where the at least one signal is set to a first voltage value (e.g., a bias voltage value) in response to the electronic system being in a powered down mode of operation. The method also includes activating a wakeup switch of the electronic system to transition the at least one signal from the first voltage value to a second voltage value (e.g., a voltage value less than the bias voltage value). The method further includes, in response to the at least one signal reaching the second voltage value, passing a battery power supply from the battery management system to the power management system via the connector. In turn, the battery power supply is provided to the electronic system.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

Illustrative embodiments will now be described with reference to the accompanying drawings. In the drawings, like reference numerals generally indicate identical, functionally similar, and/or structurally similar elements.

DETAILED DESCRIPTION

Figure 1:
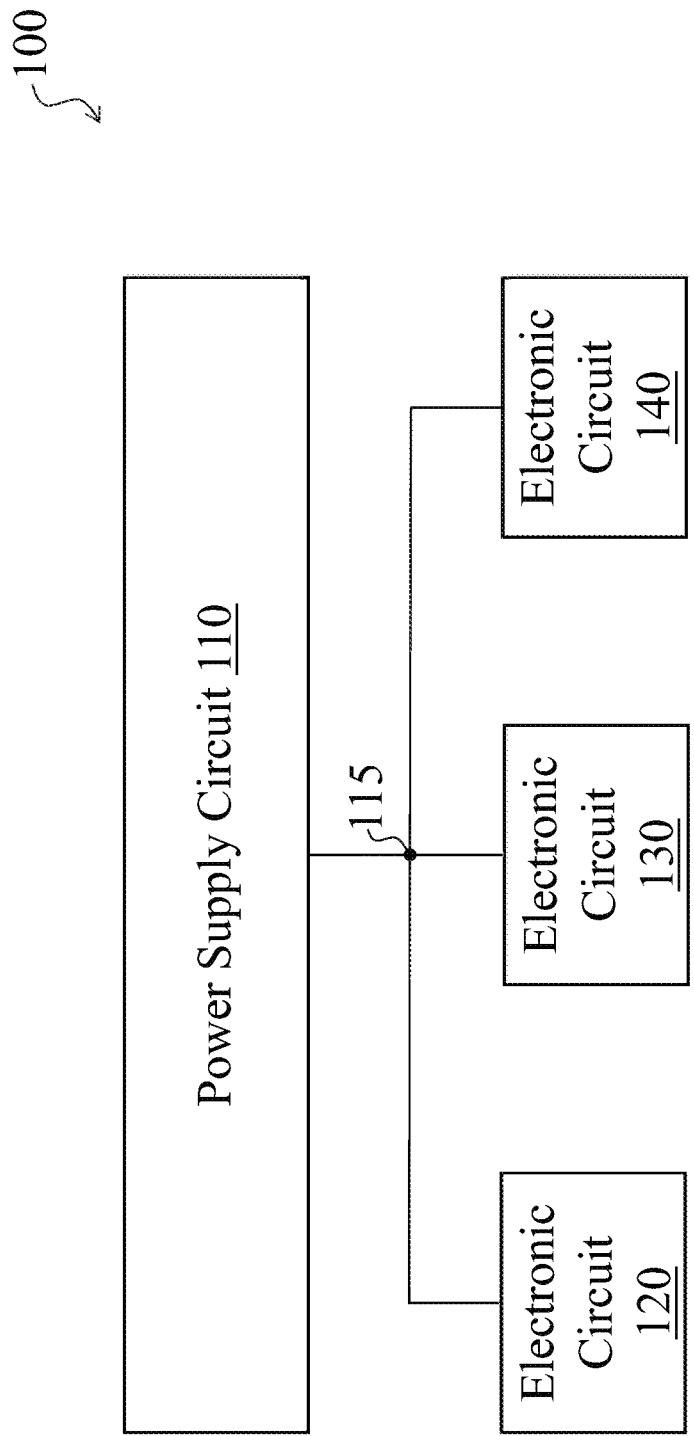
FIG. 1 is an illustration of an electronic system, according to some embodiments.

The following disclosure provides many different embodiments, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various embodiments and/or configurations discussed.

It is noted that references in the specification to "one embodiment," "an embodiment," "an example embodiment," and "exemplary" indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

In some embodiments, the terms "about" and "substantially" can indicate a value of a given quantity that varies within 20% of the value (e.g., ±1%, ±2%, ±3%, ±4%, ±5%, ±10%, ±20% of the value). These values are merely examples and are not intended to be limiting. The terms "about" and "substantially" can refer to a percentage of the values as interpreted by those skilled in relevant art(s) in light of the teachings herein.

It is to be understood that the phraseology or terminology herein is for the purpose of description and not of limitation, such that the terminology or phraseology of the present specification is to be interpreted by those skilled in relevant art(s) in light of the teachings herein.

The following disclosure describes aspects of a wakeup circuit for an electronic system. Specifically, the present disclosure describes an electronic system with a power management device, a wakeup circuit, a battery management device, and a connector. In some embodiments, the power management device and the battery management device are on different circuit boards, in which the connector provides interconnects and a conduit for the transfer of data signals, a power supply signal, and a ground signal between the two circuit boards. Due to its design, the connector can have a limited number of interconnects to transfer these signals between the two circuit boards, according to some embodiments. The battery management device provides a power supply (e.g., a battery) to the power management device (e.g., via the power supply signal of the connector). In turn, the power management device provides a supply voltage to one or more electronic circuits in the electronic system. The wakeup circuit can be used to activate the electronic system—when the system is powered down (e.g., in an off state or powered down mode of operation)—and can re-use one or more of the connector's interconnects in its design. A benefit of the wakeup circuit, among others, is a reduction of battery consumption—and thus improving battery lifetime—when the electronic system is in a powered down mode of operation because the wakeup circuit has lower number of active components compared to other designs. Another benefit of the wakeup circuit, among others, is that one or more existing connector interconnects between the power management device and the battery management device can be re-used during electronic system's powered down mode of operation, thus simplifying and reducing cost of the wake-up circuit design by not requiring the implementation of additional interconnects.

FIG. 1 is an illustration of an electronic system 100, according to some embodiments. Electronic system 100 includes a power supply circuit 110 and electronic circuits 120, 130, and 140. Power supply circuit 110 can convert a source of incoming power (e.g., a battery or other suitable power supply source) to desired voltage/current characteristics of electronic circuits 120, 130, and 140. In some embodiments, power supply circuit 110 provides a supply voltage 115 (e.g., a power supply voltage 115) to electronic circuits 120, 130, and 140 and regulates supply voltage 115 as electronic circuits 120, 130, and 140 vary in voltage and/or current consumption (also referred to herein as a "load"). Supply voltage 115 can be at any suitable voltage level for electronic circuits 120, 130, and 140, such as at a power supply voltage (e.g., 1.0 V, 1.2 V, 1.8 V, 2.4 V, 3.3 V, and 5.0 V). Though electronic system 100 shows power supply circuit 110 with a single supply voltage 115 electrically connected to electronic circuits 120, 130, and 140, electronic system 100 is not limited to such circuit architecture. For example, power supply circuit 110 can provide different supply voltages to one or more of electronic circuits 120, 130, and 140. These other circuit architectures are within the scope of the present disclosure.

Electronic circuits 120, 130, and 140 can be any suitable type of electronic device, such as a processor circuit, a memory circuit, an input/output (I/O) circuit, a peripheral circuit, an RF circuit, an NFC circuit, and combinations thereof. In some embodiments, the processor circuit can include a general-purpose processor to perform computational operations, such as a central processing unit. The processor circuit can also include other types of processing units, such as a graphics processing unit, an application-specific circuit, and a field-programmable gate array circuit. In some embodiments, the memory circuit can include any suitable type of memory, such as Dynamic Random Access Memory, Static Random Access Memory, Read-Only Memory, Electrically Programmable Read-Only Memory, non-volatile memory, and combinations thereof.

In some embodiments, the I/O circuit can coordinate data transfer between one of electronic circuits 120, 130, and 140 (e.g., a processor circuit) and a peripheral circuit. The I/O circuit can implement a version of Universal Serial Bus protocol, an I2C communication bus protocol, a Serial Peripheral Interface (SPI) communication protocol, a System Power Management Interface Protocol (SPMI), a Mobile Industry Processor Interface (MIPI) protocol, a low-power display port (LPDP) protocol, a Peripheral Component Interconnect Express (PCIe) communication protocol, an IEEE 1394 (Firewire®) protocol, or any other suitable communication protocol, according to some embodiments. Further, in some embodiments, the I/O circuit can perform data processing to implement networking standards, such as an Ethernet (IEEE 802.3) networking standard. Examples of the peripheral circuit can include storage devices (e.g., magnetic or optical media-based storage devices, including hard drives, tape drives, CD drives, DVD drives, and any suitable storage device), audio processing systems, and any suitable type of peripheral circuit, according to some embodiments.

In some embodiments, the RF circuit can control the receipt and transmission of data signals in the RF spectrum. The RF circuit can include a receiver circuit to receive and process data signals. The RF circuit can also include a transmitter circuit to process and amplify signals sent from electronic system 100. The receiver and transmitter circuits can include an antenna, an amplifier circuit, an oscillator circuit, other suitable circuits, and combinations thereof. In some embodiments, during a powered down mode of operation of electronic system 100, the RF circuit remain on (e.g., active) and consume power from power supply circuit 110—thus contributing to an off-state standby leakage of electronic system 100.

In some embodiments, the NFC circuit enables short-range, wireless communication (e.g., about 4 cm or less) between electronic system 100 and another electronic system. The NFC circuit can include an NFC reader circuit to initiate communication with an NFC tag, power up the NFC tag, and send commands through a magnetic field to the NFC tag. Once communication is established with the NFC tag, the NFC reader can also write data into the NFC tag. In some embodiments, during a powered down mode of operation of electronic system 100, the NFC circuit can remain on (e.g., active) and consume power from power supply circuit 110—thus contributing to an off-state standby leakage of electronic system 100.

The embodiments described herein are directed to reduce power consumption—e.g., power consumed by the RF circuit, the NFC circuit, and other circuits—when electronic system 100 is in a powered down mode of operation by lowering the number of active components when electronic system is in this mode of operation.

Figure 2:
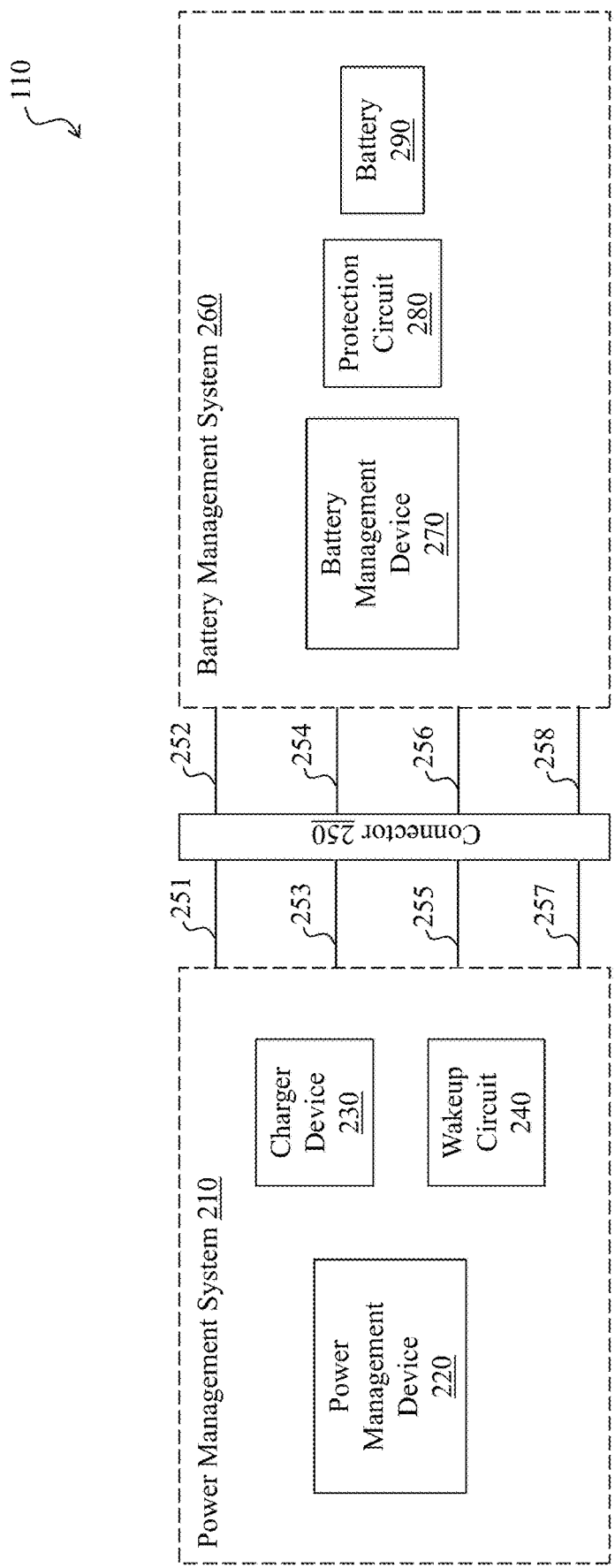
FIG. 2 is an illustration of a block-level representation of a power supply circuit, according to some embodiments.

FIG. 2 is an illustration a block-level representation of power supply circuit 110, according to some embodiments. Power supply circuit 110 includes a power management system 210, a connector 250, and a battery management system 260. In some embodiments, power management system 210 and battery management system 260 can be on different circuit boards, in which signals can be transferred between the two circuit boards via connector 250 and interconnects 251-258. In some embodiments, connector 250 can have a limited number of interconnects to transfer signals between the two circuit boards.

For example, interconnects 253 and 254 and connector 250 transfer a data signal between power management system 210 and battery management system 260. This data signal can be received at (or transferred out of) an I/O pin of connector 250 electrically connected to interconnect 253 and received at (or transferred out of) another I/O pin of connector 250 electrically connected to interconnect 254. Similarly, interconnects 255 and 256 and connector 250 transfer another data signal between power management system 210 and battery management system 260. This other data signal can be received at (or transferred out of) an I/O pin of connector 250 electrically connected to interconnect 255 and received at (or transferred out of) another I/O pin of connector 250 electrically connected to interconnect 256. Further, a power supply signal can be transferred between power management system 210 and battery management system 260 via interconnects 251 and 252 and connector 250. This power supply signal can be received at (or transferred out of) an I/O pin of connector 250 electrically connected to interconnect 251 and received at (or transferred out of) another I/O pin of connector 250 electrically connected to interconnect 252. A ground signal can be transferred between power management system 210 and battery management system 260 via interconnects 257 and 258 and connector 250. This ground signal can be received at (or transferred out of) an I/O pin of connector 250 electrically connected to interconnect 257 and received at (or transferred out of) another I/O pin of connector 250 electrically connected to interconnect 258.

Referring to FIG. 2, power management system 210 can include a power management device 220, a charger device 230, and a wakeup circuit 240, according to some embodiments. Power management device 220 can provide supply voltage 115 to electronic circuits 120, 130, and 140 of FIG. 1. Power management device 220 can receive a power supply from battery management system 260, convert the power supply to one or more supply voltages 115 (e.g., 1.0 V, 1.2 V, 1.8 V, 2.4 V, 3.3 V, and 5.0 V), and distribute the one or more supply voltages 115 to electronic circuits 120, 130, and 140. Charger device 230 can charge a battery in battery management system 260 (e.g., a battery 290) with a charging circuit that charges the battery using an external power supply (e.g., an electrical wall outlet).

In some embodiments, wakeup circuit 240 wakes up electronic system 100 when powered down (e.g., in an off state or powered down mode of operation) in response to a switch being activated by, for example, a user. Additional details of wakeup circuit 240 is described below with respect to FIGS. 3 and 4.

Referring to FIG. 2, battery management system 260 can include a battery management device 270, a protection circuit 280, and a battery 290. Battery management device 270 controls the transfer of battery 290 (e.g., power supply) to power management system 210. Additionally, battery management device 270 can provide one or more oversight functions for battery 290. These oversight functions can include monitoring battery 290 to ensure it delivers a targeted range of voltage and current for a duration of time in view of expected load scenarios, estimating a state of charge of battery 290 (e.g., charge capacity of battery 290), monitoring a temperature of battery 290 to ensure optimal battery performance, and balancing cells in battery 290 to optimize battery operation. Battery 290 can be a lithium-ion battery, an array of lithium-ion batteries, or any other suitable battery.

Protection circuit 280 monitors battery 290 to ensure that battery 290 operates under safe operating conditions. For example, protection circuit 280 can monitor battery 290 for overvoltage and overcurrent conditions, which may cause battery 290 to catch fire and explode. If protection circuit 280 determines that battery 290 approaches either the overvoltage or overcurrent condition, protection circuit 280 can disconnect battery 290 from battery management device 270 for safety.

Figure 3:
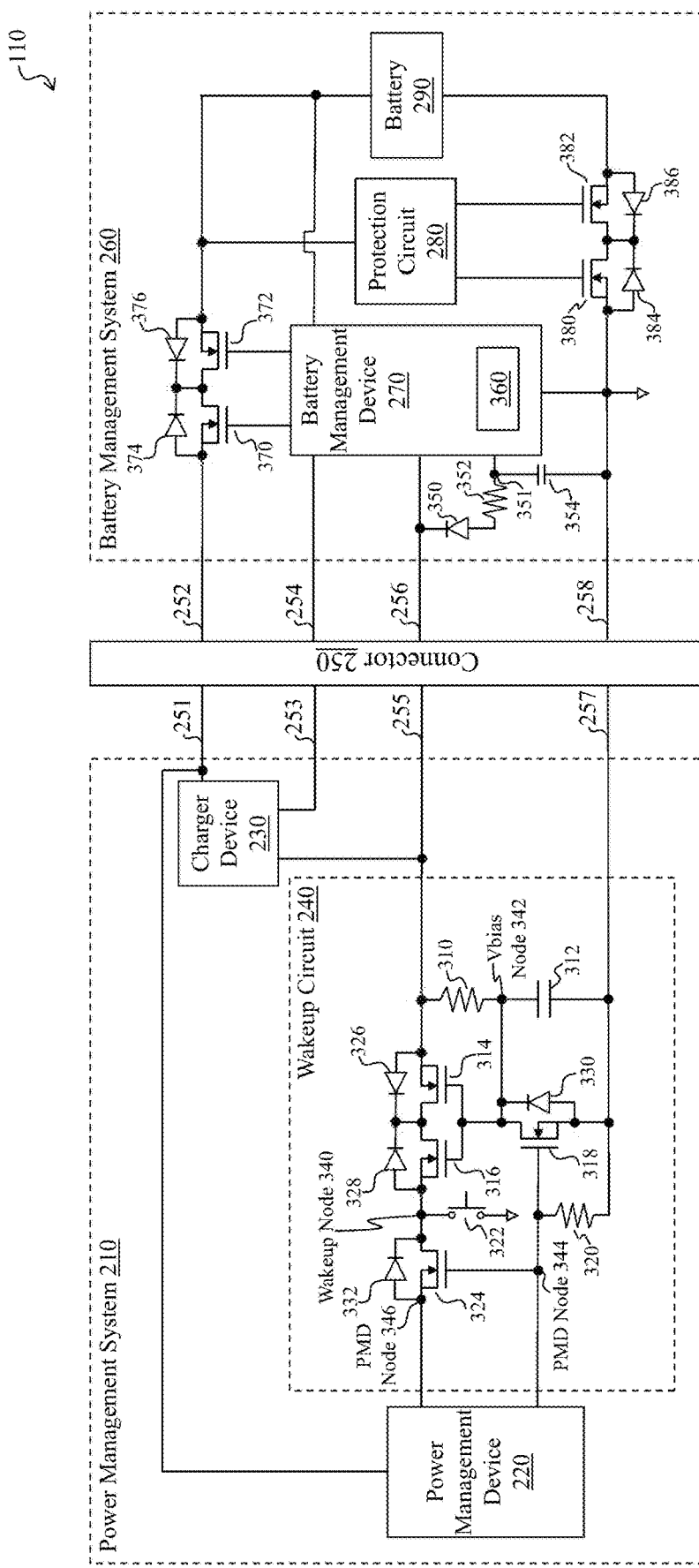
FIG. 3 is an illustration of a circuit-level representation of a power supply circuit, according to some embodiments.

FIG. 3 is an illustration of a circuit-level representation of power supply circuit 110 of FIG. 2, according to some embodiments. Specifically, FIG. 3 shows a circuit-level representation of wakeup circuit 240 and electrical connections in and among power management system 210, connector 250, and battery management system 260.

Battery management system 260 includes a diode 350, a resistive element 352, a capacitive element 354, a first transistor 370, a second transistor 372, a first diode 374, a second diode 376, a third transistor 380, a fourth transistor 382, a third diode 384, and a fourth diode 386. In some embodiments, third diode 382 and fourth diode 386 are integrated body diodes of third transistor 380 and fourth transistor 382, respectively. Battery management device 270 also includes a voltage regulator 360. During a powered down mode of operation, voltage regulator 360 generates a bias voltage that is provided to capacitive element 354, according to some embodiments. Voltage regulator 360 can receive a power supply from battery 290, generate a suitable bias voltage (e.g., 1.2 V, 1.4 V, 1.6 V, 1.8 V, 2.0 V), and output the bias voltage to capacitive element 354 (via signal line 351). In some embodiments, voltage regulator 360 can be a low-dropout voltage regulator. Capacitive element 354 can be a capacitor with any suitable capacitance (e.g., about 0.1 µF to about 0.8 µF).

Capacitive element 354 can be electrically connected to resistive element 352, which is electrically connected to diode 350. In some embodiments, resistive element 352 is configured to protect battery management device in a scenario where interconnect 255/256 is accidentally shorted to ground. In some embodiments, diode 350 is configured to protect battery management device 270 in a scenario where an external voltage higher than, for example, 1.8 V is shorted to interconnect 255/256. In some embodiments, resistive element 352 can be a resistor with any suitable resistance (e.g., about 1.0 kΩ to about 15 kΩ).

Battery management device 270 controls gate terminals of first transistor 370 and second transistor 372 to pass battery 290 to interconnect 252. During a powered down mode of operation, battery management device 270 turns off first transistor 370 and second transistor 372 to prevent battery 290 from being passed to interconnect 252. Conversely, during a powered up mode of operation, battery management device 270 turns on first transistor 370 and second transistor 372 to pass battery 290 to interconnect 252. In some embodiments, with first diode 374 and second diode 376, first transistor 370 and second transistor 372 operate as a bidirectional switch, enabling bidirectional current flow when the switch is closed (e.g., first transistor 370 and second transistor 372 are on) and bidirectional voltage blocking when the switch is open (e.g., first transistor 370 and second transistor 372 are off). First transistor 370 and second transistor 372 can be an n-type metal-oxide-semiconductor field effect transistor or a p-type metal-oxide-semiconductor field effect transistor. Further, in some embodiments, first diode 374 and second diode 376 can be intrinsic body diodes for first transistor 370 and second transistor 372, respectively.

Protection circuit 280 controls gate terminals of third transistor 380 and fourth transistor 382 to pass battery 290 to power management system 210. During an overvoltage/overcurrent condition, protection circuit 280 turns off third transistor 380 and fourth transistor 382 to prevent battery 290 from being passed to power management system 210. Conversely, during a non-overvoltage/overcurrent condition, protection circuit 280 turns on third transistor 380 and fourth transistor 382 to pass battery 290 to power management system 210. In some embodiments, with third diode 384 and fourth diode 386, third transistor 380 and fourth transistor 382 operate as a bidirectional switch, enabling bidirectional current flow when the switch is closed (e.g., third transistor 380 and fourth transistor 382 are on) and bidirectional voltage blocking when the switch is open (e.g., third transistor 380 and fourth transistor 382 are off). Third transistor 380 and fourth transistor 382 can be an n-type metal-oxide-semiconductor field effect transistor or a p-type metal-oxide-semiconductor field effect transistor. Further, in some embodiments, third diode 384 and fourth diode 386 can be intrinsic body diodes for third transistor 380 and fourth transistor 382, respectively.

In power management system 210, wakeup circuit 240 includes a first resistive element 310, a capacitive element 312, a first transistor 314, a second transistor 316, a third transistor 318, a second resistive element 320, a wakeup switch 322, a fourth transistor 324, a first diode 326, a second diode 328, a third diode 330, and a fourth diode 332. One or more components of wakeup circuit 240 can be implemented in an integrated circuit placed on a circuit board that power management system 210 resides on. Alternatively, one or more components of wakeup circuit 240 can be discrete components placed on the circuit board that power management system 210 resides on.

During a powered down mode of operation, wakeup circuit 240 receives a bias voltage from battery management system 260 via interconnects 255 and 256 and connector 250. In turn, capacitive element 312 charges to the bias voltage, which propagates to Vbias node 342 in wakeup circuit 240—through first resistive element 310—such that first transistor 314 and second transistor 316 are turned on, finally passing the bias voltage to wakeup node 340 in wakeup circuit 240. First resistive element 310 can be a resistor with any suitable resistance (e.g., about 10 kΩ to about 12 kΩ). Capacitive element 312 can store charge to maintain the voltage at Vbias node 342. Capacitive element 312 can be a capacitor with any suitable capacitance (e.g., about 0.4 µF to about 0.6 µF). In some embodiments, with first diode 326 and second diode 328, first transistor 314 and second transistor 316 operate as a bidirectional switch, enabling bidirectional current flow when the switch is closed (e.g., first transistor 314 and second transistor 316 are on) and bidirectional voltage blocking when the switch is open (e.g., first transistor 314 and second transistor 316 are off). First transistor 314 and second transistor 316 can be an n-type metal-oxide-semiconductor field effect transistor, according to some embodiments. In some embodiments, first transistor 314 and second transistor 316 can be a p-type metal-oxide-semiconductor field effect transistor. Further, in some embodiments, first diode 326 and second diode 328 can be intrinsic body diodes for first transistor 314 and second transistor 316, respectively.

Further, during the powered down mode of operation, third transistor 318 and fourth transistor 324 are off. In some embodiments, second resistive element 320 provides a current path to ground (e.g., via interconnects 257 and 258 and connector 250), thus turning off third transistor 318 and fourth transistor 324. Third transistor 318 and fourth transistor 324 can be an n-type metal-oxide-semiconductor field effect transistor, according to some embodiments. In some embodiments, third transistor 318 and fourth transistor 324 can be a p-type metal-oxide-semiconductor field effect transistor. Third diode 330 and fourth diode 332 can be intrinsic body diodes for third transistor 318 and fourth transistor 324, respectively, according to some embodiments. Second resistive element 320 can be a resistor with any suitable resistance (e.g., about 100 kΩ to about 400 kΩ).

In some embodiments, wakeup switch 322 is a mechanical switch that, when pressed (or activated), pulls wakeup node 340 and the voltage at interconnect 255 to a reference voltage (e.g., ground). In some embodiments, when wakeup switch 322 is pressed for at least a predetermined amount of time (e.g., greater than about 10 µs), electronic system 100 enters a power up mode of operation where the voltage level at wakeup node 340 is pulled from the bias voltage to the reference voltage (e.g., ground). Battery management device 270 can detect the change in voltage level—e.g., from a first voltage value associated with the bias voltage to a second voltage value associated with the bias voltage being pulled to ground—via interconnects 255 and 256 and connector 250 and provide battery 290 to power management system 210. For example, when the second voltage value reaches a predetermined value (e.g., 1.0 V, 1.2 V, or 1.4 V), battery management device 270 can turn on first transistor 370 and second transistor 372, thus passing battery 290 to power management system 210 via interconnects 251, 252, 257, and 258 and connector 250. In some embodiments, the rate at which the voltage level transitions from the first voltage value to the second voltage value can be based on a resistor-capacitor delay created by first resistive element 310 and capacitive element 312.

In response to receiving battery 290 via interconnect 251, power management device 220 turns on third transistor 318 and fourth transistor 324 by providing a sufficient voltage (e.g., a power supply voltage) to power management device (PMD) node 344. As a result, the voltage level of interconnect 255 is pulled to ground through third transistor 318 and first transistor 314 and second transistor 316 are off. Power management device 220 also outputs a reference voltage (e.g., a power supply voltage) to PMD node 346, such that the reference voltage is passed to wakeup node 340, via fourth transistor 324, upon completion of the power up mode of operation. In some embodiments, fourth transistor 324 operates as a switch controlled by the voltage at PMD node 344.

Figure 4:
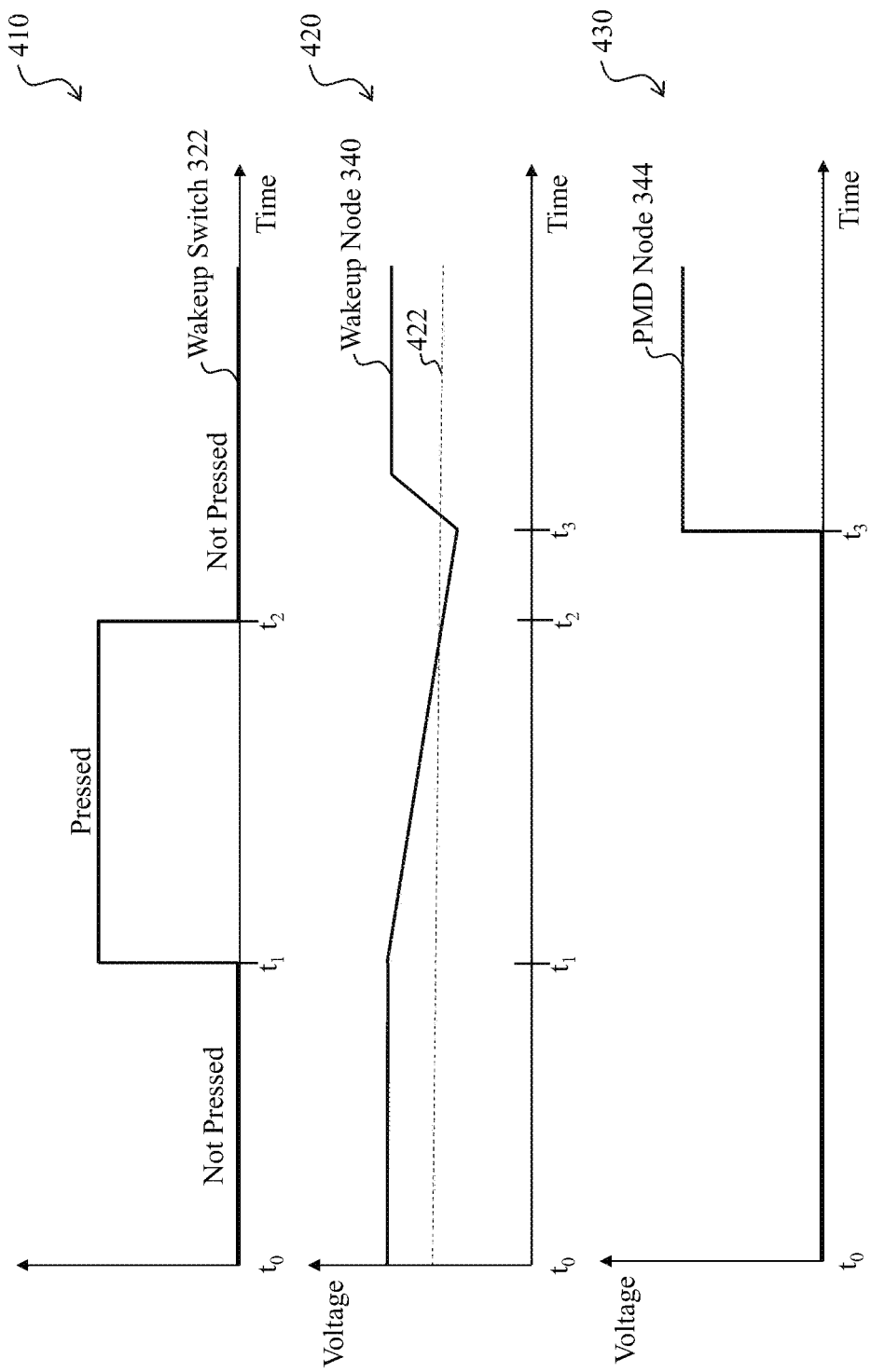
FIG. 4 is an illustration of waveforms showing an operation of the power supply circuit of FIG. 3, according to some embodiments.

FIG. 4 is an illustration of waveforms 410, 420, and 430 showing an operation of the power supply circuit of FIG. 3, according to some embodiments. Waveform 410 shows an example behavior of wakeup switch 322 over time. Waveform 420 shows an example behavior of wakeup node 340 over time. Waveform 430 shows an example behavior of PMD node 344 over time. The curvatures in waveforms 410, 420, and 430 are exemplary and for illustration purposes; these waveforms may include different curvatures.

Referring to waveform 410, during a time period time $t_0$ to time $t_1$, electronic system 100 is in a powered down mode of operation and wakeup switch 322 has not been pressed (or activated). During a time period time $t_1$ to time $t_2$, wakeup switch 322 is pressed or activated. In some embodiments, wakeup switch 322 is pressed or activated for at least a predetermined amount of time (e.g., the time period time $t_1$ to time $t_2$ is greater than about 10 μs), such that electronic system 100 enters a power up mode of operation.

Referring to waveform 420, during the time period time $t_0$ to time $t_1$, wakeup node 340 is at a bias voltage generated by voltage regulator 360 in battery management device 270 and transferred to wakeup circuit 240 via interconnects 255 and 256 and connector 250. During the time period time $t_1$ to time $t_2$, the voltage level at wakeup node 340 is pulled from the bias voltage to a reference voltage (e.g., ground). During this time period, wakeup node 340 reaches a voltage level 422 (e.g., 1.0 V, 1.2 V, or 1.4 V), in which battery management device 270 detects the change in voltage and provides battery 290 to power management system 210. Battery management device 270 turns on first transistor 370 and second transistor 372, thus passing battery 290 to power management system 210 via interconnects 251, 252, 257, and 258 and connector 250.

Referring to waveform 430, in response to receiving battery 290 via interconnect 251, power management device 220 turns on third transistor 318 and fourth transistor 324 by providing a sufficient voltage (e.g., a power supply voltage) to PMD node 344 at time $t_3$. As a result, the voltage level of interconnect 255 is pulled to ground through third transistor 318 and first transistor 314 and second transistor 316 are off. At time $t_3$, power management device 220 also outputs a power supply voltage to PMD node 346, such that the power supply voltage is passed to wakeup node 340 (as shown in waveform 420), via fourth transistor 324, upon completion of the power up mode of operation.

Figure 5:
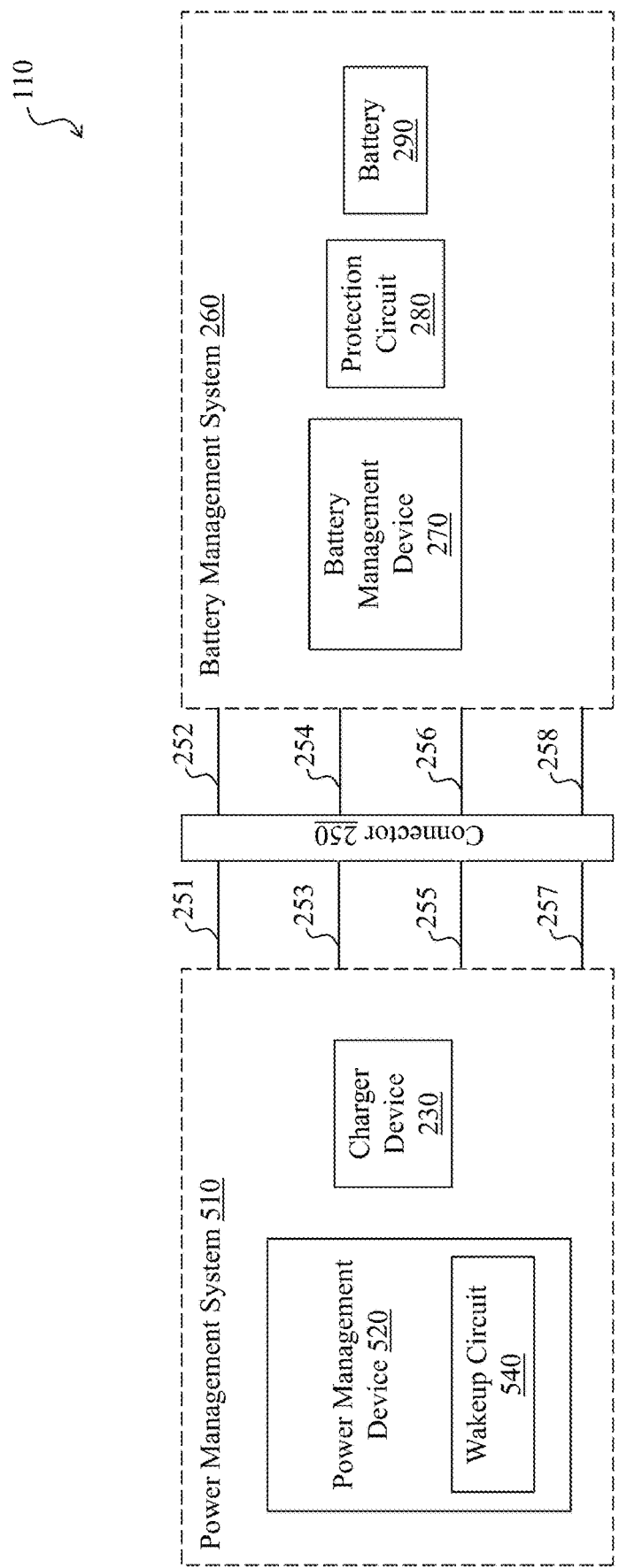
FIG. 5 is an illustration of another block-level representation of a power supply circuit, according to some embodiments.

FIG. 5 is an illustration of another block-level representation of power supply circuit 110, according to some embodiments. Power supply circuit 110 includes a power management system 510, a connector 250, and a battery management system 260. In some embodiments, power management system 510 and battery management system 260 can be on different circuit boards, in which signals can be transferred between the two circuit boards via connector 250 and interconnects 251-258. Connector 250, interconnects 251-258, and battery management 260 are described above with respect to FIGS. 2 and 3.

Power management system 510 can include a power management device 520 and charger device 230, according to some embodiments. Power management device 520 can provide supply voltage 115 to electronic circuits 120, 130, and 140 of FIG. 1. Power management circuit 520 can receive a power supply from battery management system 260, convert the power supply to one or more supply voltages 115 (e.g., 1.0 V, 1.2 V, 1.8 V, 2.4 V, 3.3 V, and 5.0 V), and distribute the one or more supply voltages 115 to electronic circuits 120, 130, and 140. In some embodiments, power management device 520 includes a wakeup circuit 540, which wakes up electronic system 100 when powered down (e.g., in an off state or powered down mode of operation) in response to a switch being activated by, for example, a user. Additional details of wakeup circuit 540 is described below with respect to FIGS. 6 and 7. Charger device 230 is described above with respect to FIGS. 2 and 3.

Figure 6:
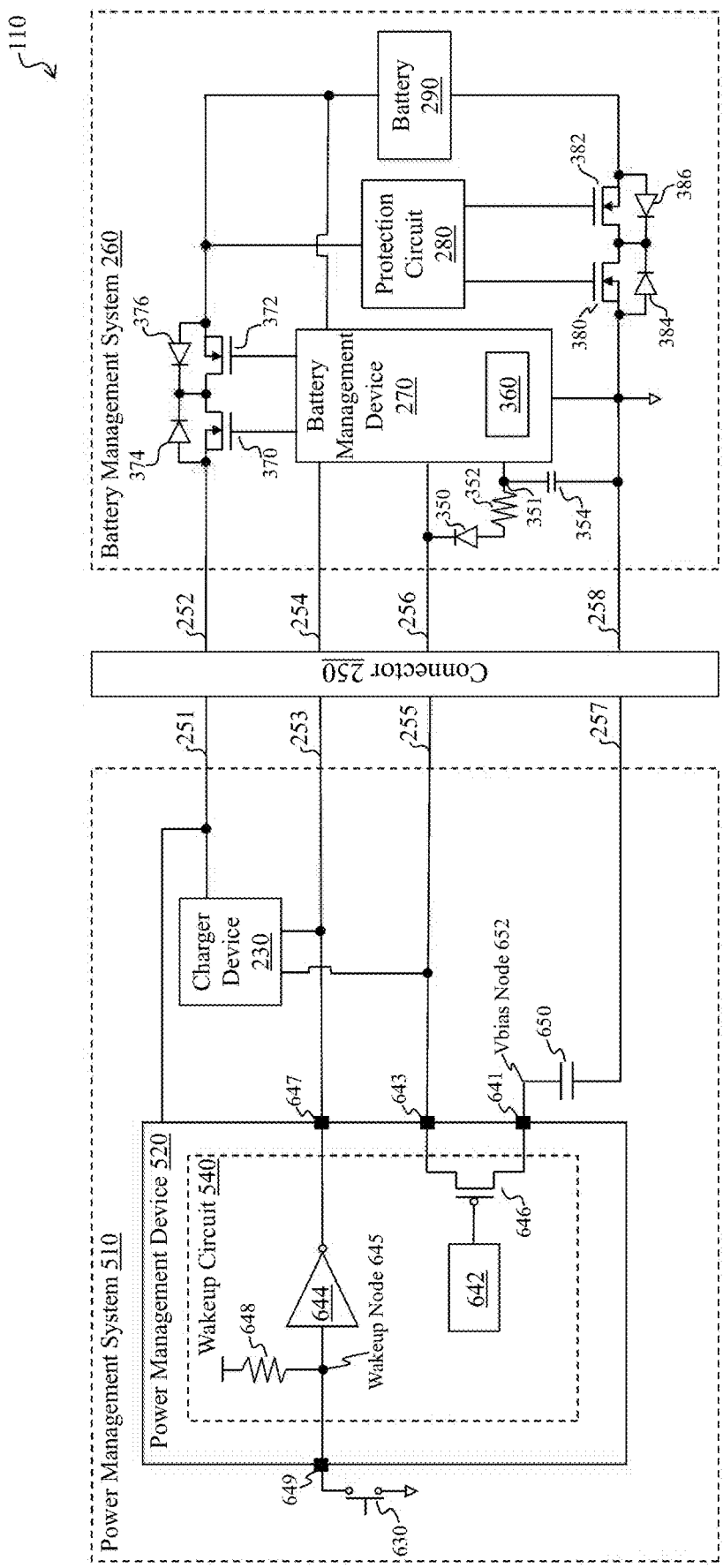
FIG. 6 is an illustration of another circuit-level representation of a power supply circuit, according to some embodiments.

FIG. 6 is an illustration of a circuit-level representation of power supply circuit 110 of FIG. 5, according to some embodiments. Specifically, FIG. 6 shows a circuit-level representation of wakeup circuit 540 and electrical connections in and among power management system 510, connector 250, battery management system 260, and a wakeup switch 630. The circuit-level description of battery management system 260 is described above with respect to FIG. 3.

Wakeup circuit 540 includes a controller 642, a buffer circuit 644, a transistor 646, and a resistive element 648. In some embodiments, these components can be integrated into the design of power management device 520—e.g., implemented in the same integrated circuit as power management device 520. During a powered down mode of operation, at an I/O pin 643, wakeup circuit 540 receives a bias voltage from battery management system 260 via interconnects 255 and 256 and connector 250. Controller 642 and buffer circuit 644 can use the bias voltage as a power supply to their respective circuits. Further, a terminal of resistive element 648 can be electrically connected to the bias voltage.

During the powered down mode of operation, via transistor 646, controller 642 passes the bias voltage from I/O pin 643 to a voltage bias I/O pin 641. Transistor 646 can be an n-type metal-oxide-semiconductor field effect transistor and operate as a switch controlled by controller 642, according to some embodiments. In some embodiments, transistor 646 can be a p-type metal-oxide-semiconductor field effect transistor and operate as a switch controlled by controller 642. Capacitive element 650 can store charge to maintain the bias voltage at a Vbias node 652. Capacitive element 650 can be a capacitor with any suitable capacitance (e.g., about 0.1 μF to about 0.4 μF).

Further, during the powered down mode of operation, resistive element 648 (with a terminal electrically connected to the bias voltage) can pull a wakeup node 645 to the bias voltage. Resistive element 648 can be a resistor with any suitable resistance (e.g., about 100 kΩ to about 400 kΩ). With wakeup node 645 at the bias voltage (e.g., a logic high signal), buffer circuit 644 can receive the bias voltage at an input and output a first voltage value (e.g., a logic low signal, such as ground) to an I/O pin 647, according to some embodiments. The first voltage value at I/O pin 647 is received by battery management device 270 via interconnects 253 and 254 and connector 250. In some embodiments, buffer circuit 644 can be an inverter circuit.

In some embodiments, wakeup switch 630 is a mechanical switch that, when pressed (or activated), pulls wakeup node 645 to a reference voltage (e.g., ground). In some embodiments, when wakeup switch 630 is pressed for at least a predetermined amount of time (e.g., greater than about 10 µs), electronic system 100 enters a power up mode of operation where the voltage level at wakeup node 645 is pulled from the bias voltage to the reference voltage (e.g., ground). As a result, an output of buffer circuit 644 transitions from the first voltage value (e.g., a logic low signal, such as ground) to a second voltage value (e.g., a logic high signal, such as the bias voltage). Battery management device 270 can detect the change in voltage level of the output of buffer circuit 644 via interconnects 253 and 254 and connector 250 and provide battery 290 to power management system 510. Battery management device 270 can turn on first transistor 370 and second transistor 372, thus passing battery 290 to power management system 210 via interconnects 251, 252, 257, and 258 and connector 250.

In response to receiving battery 290 via interconnect 251, controller 642 in wakeup circuit 540 turns off transistor 646, thus preventing the bias voltage from being passed from I/O pin 643 to voltage bias I/O pin 641. Further, wakeup circuit 540 sets the voltage level of wakeup node 645 (e.g., input to buffer circuit 644) to a reference voltage (e.g., a power supply voltage or ground), according to some embodiments.

Figure 7:
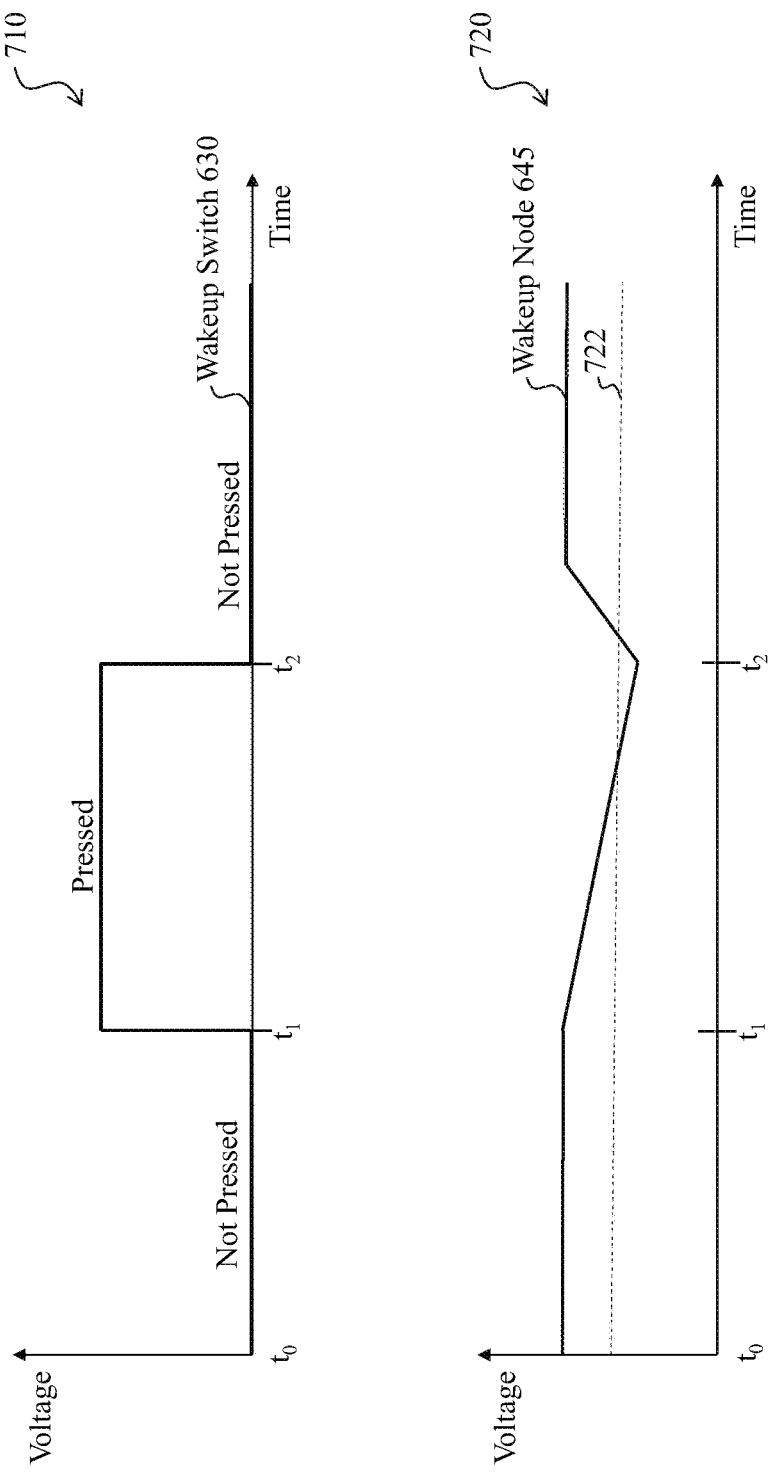
FIG. 7 is an illustration of waveforms showing an operation of the power supply circuit of FIG. 6, according to some embodiments.

FIG. 7 is an illustration of waveforms 710 and 720 showing an operation of the power supply circuit of FIG. 6, according to some embodiments. Waveform 710 shows an example behavior of wakeup switch 630 over time. Waveform 720 shows an example behavior of wakeup node 645 over time. The curvatures in waveforms 710 and 720 are exemplary and for illustration purposes; these waveforms may include different curvatures.

Referring to waveform 710, during a time period time $t_0$ to time $t_1$, electronic system 100 is in a powered down mode of operation and wakeup switch 630 has not been pressed (or activated). During a time period time $t_1$ to time $t_2$, wakeup switch 630 is pressed or activated. In some embodiments, wakeup switch 630 is pressed or activated for at least a predetermined amount of time (e.g., the time period time $t_1$ to time $t_2$ is greater than about 10 µs), such that electronic system 100 enters a power up mode of operation.

Referring to waveform 720, during the time period time $t_0$ to time $t_1$, wakeup node 645 is at a bias voltage generated by voltage regulator 360 in battery management device 270 and transferred to wakeup circuit 540 via interconnects 255 and 256 and connector 250. During the time period time $t_1$ to time $t_2$, the voltage level at wakeup node 645 is pulled from the bias voltage to a reference voltage (e.g., ground). During this time period, wakeup node 645 reaches a voltage level 722 (e.g., 0.6 V, 0.8 V, or 1.0 V), in which battery management device 270 detects the change in voltage at I/O pin 647 and provides battery 290 to power management system 510. Battery management device 270 turns on first transistor 370 and second transistor 372, thus passing battery 290 to power management system 210 via interconnects 251, 252, 257, and 258 and connector 250. At time $t_2$ and after wakeup switch 630 has been de-pressed (or de-activated), wakeup circuit 540 sets the voltage level of wakeup node 645 (e.g., input to buffer circuit 644) to a separate reference voltage (e.g., a power supply voltage generated by power management device 520) that is not generated from the bias voltage stored at the Vbias node 652.

Figure 8:
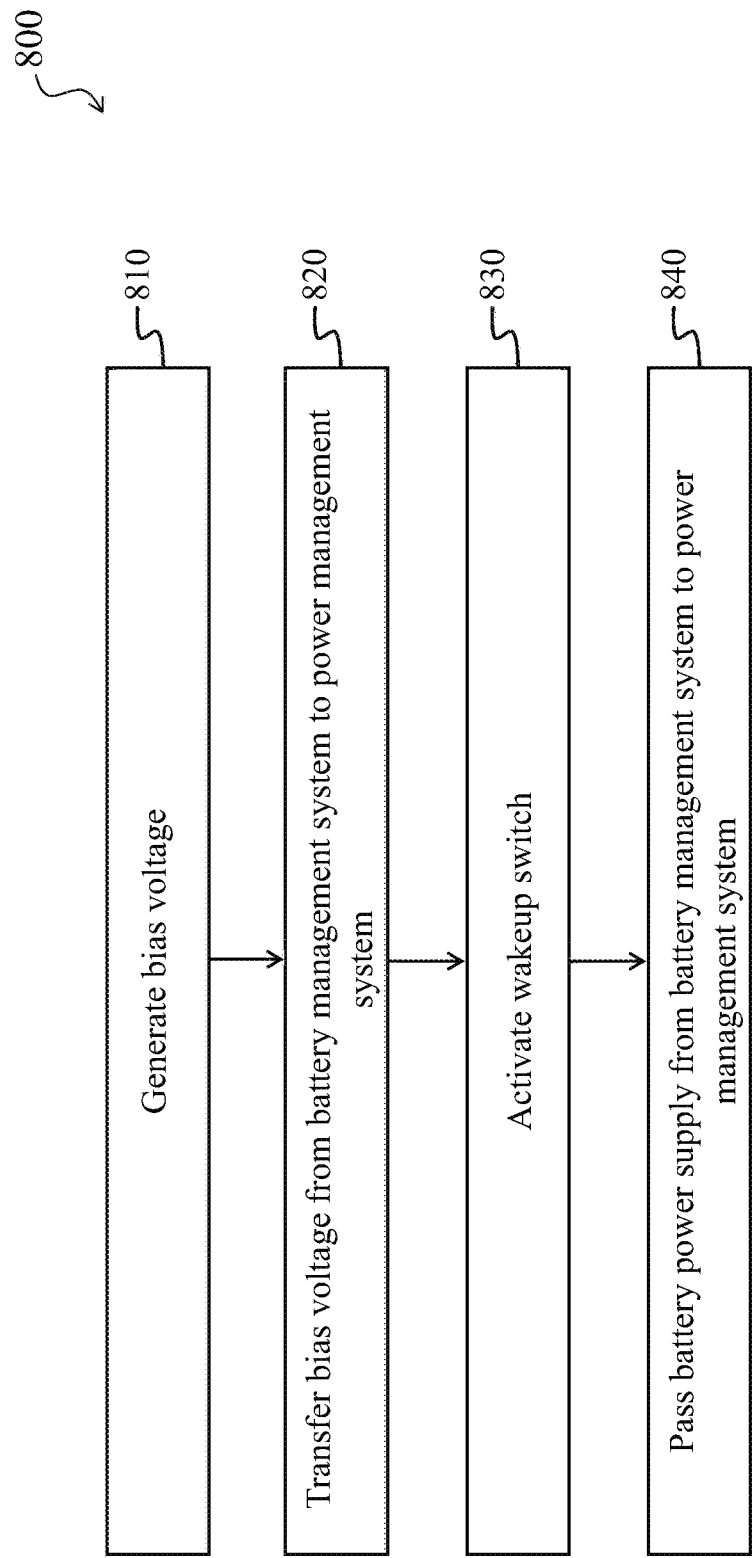
FIG. 8 is an illustration of a method for waking up an electronic system, according to some embodiments.

FIG. 8 is an illustration of a method 800 for waking up an electronic system, according to some embodiments. For illustrative purposes, the operations illustrated in method 800 will be described with reference to the circuit-level representation of power supply circuit 110 shown in FIGS. 3 and 6. Other representations of power supply circuit 110 are within the scope of the present disclosure. Also, additional operations may be performed between various operations of method 800 and may be omitted merely for clarity and ease of description. The additional operations can be provided before, during, and/or after method 800, in which one or more of these additional operations are briefly described herein. Moreover, not all operations may be needed to perform the disclosure provided herein. Additionally, some of the operations may be performed simultaneously or in a different order than shown in FIG. 8. In some embodiments, one or more other operations may be performed in addition to or in place of the presently-described operations.

At operation 810 of FIG. 8, a bias voltage is generated at a battery management system of an electronic system. Referring to power supply circuit 110 in FIGS. 3 and 6, voltage regulator 360 in battery management device 270 generates the bias voltage.

At operation 820 of FIG. 8, the bias voltage is transferred, via a connector of the electronic system, from the battery management system to a power management system of the electronic system. Referring to power supply circuit 110 in FIGS. 3 and 6, the bias voltage generated by voltage regulator 360 in battery management device 270 is transferred to power management system 210/power management system 510 via interconnects 255 and 256 and connector 250. As described above, connector 250 functions as an electrical conduit to transfer signals between a power management system (e.g., power management system 210/power management system 510 on a first circuit board) and a battery management system (e.g., battery management system 260 on a second circuit board). During a powered down mode of operation, at least one signal between the power management system and the battery management system is set to a first voltage value, according to some embodiments. For example, in power supply circuit 110 of FIG. 3, the voltage level at interconnect 255 is set to the bias voltage (e.g., a first voltage value) during the powered down mode of operation. In power supply circuit 110 of FIG. 6, the voltage level at interconnect 253 (which is electrically connected to I/O pin 647) is set to ground (e.g., a first voltage value) during the powered down mode of operation.

At operation 830 of FIG. 8, a wakeup switch of the electronic system is activated so the at least one signal (from operation 820) transitions from the first voltage value to a second voltage value. In some embodiments, the wakeup switch is pressed (or activated) for a predetermined amount of time (e.g., greater than about 10 µs).

In power supply circuit 110 of FIG. 3, the voltage level at interconnect 255 tracks the voltage level of wakeup node 340, which is pulled to ground when wakeup switch 322 is pressed (or activated). The voltage level at interconnect 255 transitions to the second voltage value (e.g., voltage level 422 in waveform 420 of FIG. 4), in which battery management 270 detects the change in voltage from the first voltage value (e.g., the bias voltage) to the second voltage value.

In power supply circuit 110 of FIG. 6, the voltage level at interconnect 253 transitions from the first voltage value (e.g., ground) to a second voltage value (e.g., the bias voltage) when wakeup switch 630 is pressed (or activated). Specifically, an output of buffer circuit 644 transitions from the first voltage value (e.g., a logic low signal, such as ground) to a second voltage value (e.g., a logic high signal, such as the bias voltage). Battery management device 270 can detect the change in voltage level via interconnects 253 and 254 and connector 250.

At operation 840 of FIG. 8, a battery power supply is passed from the battery management system to the power management system, in response to the at least one signal transferred between the battery management system and power management system reaching the second voltage value. In power supply circuit 110 of FIG. 3, when the second voltage value reaches a predetermined value (e.g., 1.0 V, 1.2 V, or 1.4 V), battery management device 270 can turn on first transistor 370 and second transistor 372, thus passing battery 290 to power management system 210 via interconnects 251, 252, 257, and 258 and connector 250.

In power supply circuit 110 of FIG. 6, once the change in voltage level is detected (from operation 830), battery management device 270 can provide battery 290 to power management system 510. Battery management device 270 can turn on first transistor 370 and second transistor 372, thus passing battery 290 to power management system 210 via interconnects 251, 252, 257, and 258 and connector 250.

Aspects of a wakeup circuit for an electronic system are described herein. Specifically, the present disclosure describes an electronic system with a power management device, a wakeup circuit, a battery management device, and a connector. In some embodiments, the power management device and the battery management device are on different circuit boards, in which the connector provides interconnects and a conduit for the transfer of data signals, a power supply signal, and a ground signal between the two circuit boards. Due to its design, the connector can have a limited number of interconnects to transfer these signals between the two circuit boards, according to some embodiments. The battery management device provides a power supply (e.g., a battery) to the power management device (e.g., via the power supply signal of the connector). In turn, the power management device provides a supply voltage to one or more electronic circuits in the electronic system. The wakeup circuit can be used to activate the electronic system—when the electronic system is powered down (e.g., in an off state or powered down mode of operation)—and can re-use one or more of the connector's interconnects in its design. A benefit of the wakeup circuit, among others, is a reduction of battery consumption— and thus improving battery lifetime—when the electronic system is in a powered down mode of operation because the wakeup circuit has lower number of active components compared to other designs. Another benefit of the wakeup circuit, among others, is that one or more existing connector interconnects between the power management device and the battery management device can be re-used during electronic system's powered down mode of operation, thus simplifying and reducing cost of the wake-up circuit design by not requiring the implementation of additional interconnects.

Figure 9:
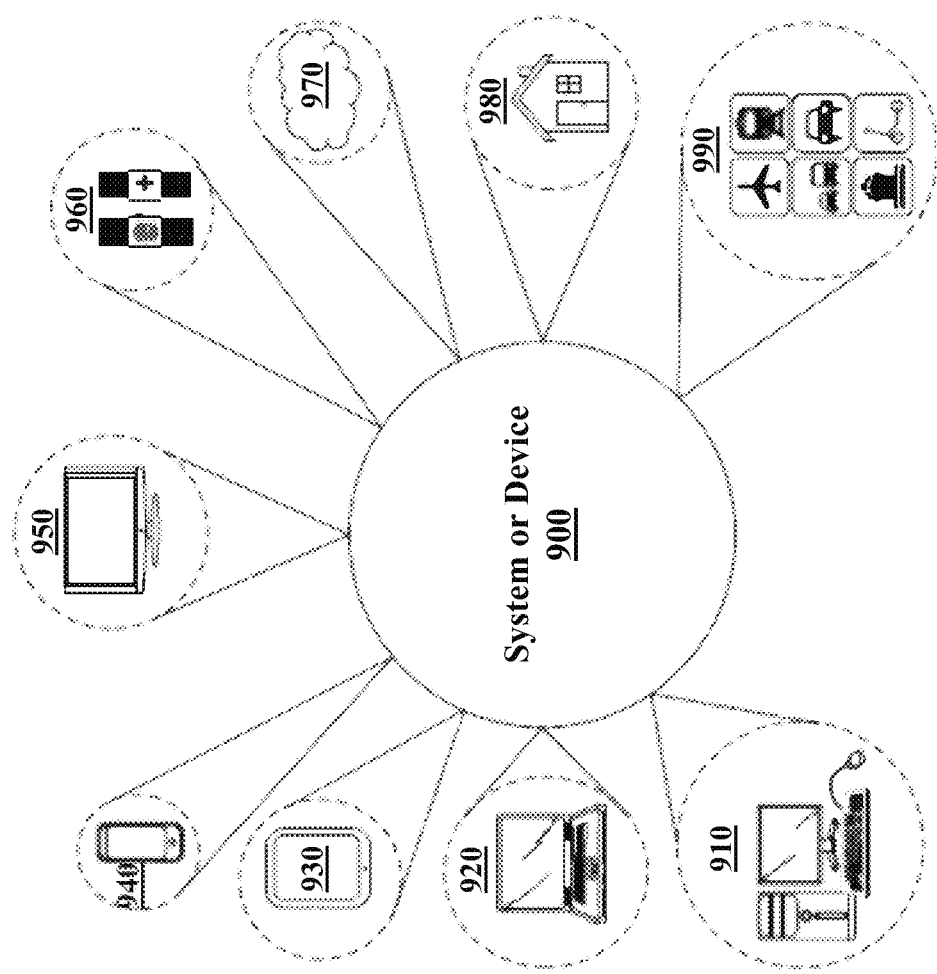
FIG. 9 is an illustration of various exemplary systems or devices that can include the disclosed embodiments.

FIG. 9 is an illustration of exemplary systems or devices that can include the disclosed embodiments. System or device 900 can incorporate one or more of the disclosed embodiments in a wide range of areas. For example, system or device 900 can be implemented in one or more of a desktop computer 910, a laptop computer 920, a tablet computer 930, a cellular or mobile phone 940, and a television 950 (or a set-top box in communication with a television).

Also, system or device 900 can be implemented in a wearable device 960, such as a smartwatch or a health-monitoring device. In some embodiments, the smartwatch can have different functions, such as access to email, cellular service, and calendar functions. Wearable device 960 can also perform health-monitoring functions, such as monitoring a user's vital signs and performing epidemiological functions (e.g., contact tracing and providing communication to an emergency medical service). Wearable device 960 can be worn on a user's neck, implantable in user's body, glasses or a helmet designed to provide computer-generated reality experiences (e.g., augmented and/or virtual reality), any other suitable wearable device, and combinations thereof.

Further, system or device 900 can be implemented in a server computer system, such as a dedicated server or on shared hardware that implements a cloud-based service 970. System or device 900 can be implemented in other electronic devices, such as a home electronic device 980 that includes a refrigerator, a thermostat, a security camera, and other suitable home electronic devices. The interconnection of such devices can be referred to as the "Internet of Things" (IoT). System or device 900 can also be implemented in various modes of transportation 990, such as part of a vehicle's control system, guidance system, and/or entertainment system.

The systems and devices illustrated in FIG. 9 are merely examples and are not intended to limit future applications of the disclosed embodiments. Other example systems and devices that can implement the disclosed embodiments include portable gaming devices, music players, data storage devices, and unmanned aerial vehicles.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventor(s), and thus, are not intended to limit the subjoined claims in any way.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
a device, comprising:
a first input/output (I/O) pin;
a second I/O pin;
a first switch configured to receive a voltage from an external device via an interconnect of a connector and to pass the voltage to the first I/O pin during a first mode of operation; and
a buffer circuit with an input electrically connected to the second I/O pin and an output electrically connected to the external device via the connector; and
a second switch electrically connected to the second I/O pin, wherein:
in response to the second switch being activated, the output of the buffer circuit transitions from a first voltage value to a second voltage value,
the second voltage value is transferred to the external device via the connector, and
after the device transitions from the first mode of operation to a second mode of operation, the interconnect of the connector is configured to transfer a signal different from that of the voltage from the external device.

2. The system of claim 1, further comprising a capacitive element electrically connected to first I/O pin.

3. The system of claim 1, further comprising a charger device electrically connected to the device and the connector.

4. The system of claim 1, wherein the device further comprises a resistive element electrically connected to the buffer circuit and configured to pull the input of the buffer circuit to the voltage in response to the system being in a powered down mode of operation.

5. The system of claim 1, wherein the first switch comprises a transistor configured to pass the voltage from the connector to the first I/O pin.

6. The system of claim 1, wherein the buffer circuit comprises an inverter circuit configured to be at a logic low signal in response to the system being in a powered down mode of operation.

7. The system of claim 1, wherein the second switch comprises a mechanical switch configured to, in response to being pressed, electrically connect the input of the buffer circuit to ground.

8. The system of claim 1, wherein the device is on a first circuit board and the external device is on a second circuit board.

9. The system of claim 8, wherein the connector is configured to transfer one or more signals between the first circuit board and the second circuit board.

10. A system, comprising:
a battery management device configured to output a bias voltage;
a connector comprising an interconnect configured to receive the bias voltage and to output the bias voltage during a powered down mode of operation and to receive a signal different from that of the bias voltage during a powered up mode of operation; and
a power management device configured to receive the bias voltage from the connector, wherein the power management device comprises:
a voltage bias I/O pin;
a wakeup I/O pin;
a first switch configured to receive the bias voltage and to pass the bias voltage to the voltage bias I/O pin; and
a buffer circuit having an input and an output, wherein the input is electrically connected to the wakeup I/O pin and the output is electrically connected to the battery management device; and
a wakeup switch electrically connected to the wakeup I/O pin of the power management device, wherein, in response to the wakeup switch being activated, the output of the buffer circuit transitions from a first voltage value to a second voltage value, and wherein the second voltage value is transferred to the battery management device via the connector.

11. The system of claim 10, further comprising:
a charger device electrically connected to the power management device and to the connector; and
a protection circuit electrically connected to the battery management device.

12. The system of claim 10, further comprising a capacitive element electrically connected to the voltage bias I/O pin.

13. The system of claim 10, wherein the power management device further comprises a resistive element electrically connected to the wakeup I/O pin and configured to pull up the wakeup I/O pin to the first voltage value in response to the wakeup switch not being activated.

14. The system of claim 10, wherein the buffer circuit is configured to receive the bias voltage as a power supply.

15. The system of claim 10, wherein, in response to receiving the second voltage value from the buffer circuit, the battery management device is configured to provide a power supply to the power management device.

16. A method, comprising:
generating, at a battery management system of an electronic system, a bias voltage;
transferring, via a connector of the electronic system, the bias voltage from the battery management system to a power management system of the electronic system, wherein the connector comprises at least one interconnect configured to transfer the bias voltage during a powered down mode of operation and to transfer a signal different from that of the bias voltage during a powered up mode of operation;
activating a wakeup switch of the electronic system to transition at least one signal from a first voltage value to a second voltage value; and
in response to the at least one signal reaching the second voltage value, passing a battery power supply from the battery management system to the power management system via the connector.

17. The method of claim 16, wherein transferring the bias voltage comprises transferring, via the connector, the bias voltage from a first circuit board that includes the battery management system to a second circuit board that includes the power management system.

18. The method of claim 16, wherein activating the wakeup switch comprises pressing the wakeup switch for a predetermined amount of time.

19. The method of claim 16, wherein passing the battery power supply comprises detecting a change in voltage level from a first voltage value associated with the bias voltage to a second voltage value associated with the bias voltage being pulled to ground.

20. The method of claim 16, wherein passing the battery power supply comprises detecting a change in voltage level from a first voltage value associated with a first output state of a buffer circuit to a second voltage value associated with a second output state of the buffer circuit.

* * * * *